United States Patent
Tang et al.

(10) Patent No.: US 8,433,665 B2
(45) Date of Patent: Apr. 30, 2013

(54) METHODS AND SYSTEMS FOR THREE-MEMRISTOR SYNAPSE WITH STDP AND DOPAMINE SIGNALING

(75) Inventors: Yi Tang, San Diego, CA (US); Jeffrey A. Levin, San Diego, CA (US); Vladimir Aparin, San Diego, CA (US); Venkat Rangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 12/831,594

(22) Filed: Jul. 7, 2010

(65) Prior Publication Data

US 2012/0011090 A1   Jan. 12, 2012

(51) Int. Cl.
*G06F 15/18* (2006.01)

(52) U.S. Cl.
USPC .................................. 706/33; 706/34

(58) Field of Classification Search ............ 706/33
See application file for complete search history.

(56) References Cited

U.S. PATENT DOCUMENTS

| | | | |
|---|---|---|---|
| 2008/0162391 A1 | 7/2008 | Izhikevich | |
| 2009/0292661 A1* | 11/2009 | Haas | 706/33 |
| 2010/0277232 A1* | 11/2010 | Snider | 327/565 |
| 2011/0004579 A1* | 1/2011 | Snider | 706/25 |
| 2011/0024710 A1* | 2/2011 | Bratkovski et al. | 257/1 |
| 2011/0024716 A1* | 2/2011 | Bratkovski et al. | 257/5 |
| 2011/0106742 A1* | 5/2011 | Pino | 706/33 |

FOREIGN PATENT DOCUMENTS

WO    2009113993 A1    9/2009

OTHER PUBLICATIONS

Afifi, A.; Ayatollahi, A.; Raissi, F.;, "Implementation of biologically plausible spiking neural network models on the memristor crossbar-based CMOS/nano circuits," Circuit Theory and Design, 2009. ECCTD 2009. European Conference on, vol., No., pp. 563-566, Aug. 23-27, 2009.*
Pérez-Carrasco, J.A.; Zamarreño-Ramos, C.; Serrano-Gotarredona, T.; Linares-Barranco, B.;, "On neuromorphic spiking architectures for asynchronous STDP memristive systems," Circuits and Systems (ISCAS), Proceedings of 2010 IEEE International Symposium on, vol., No., pp. 1659-1662, May 30, 2010-Jun. 2, 2010.*
S. Song, K. Miller, L.F. Abbott, "Competitive Hebbian learning through spike-timing-dependent synaptic plasticity", in Nature Neuroscience Article, vol. 3, No. 9, pp. 919-926, Sep. 2000.
.M. Izhikevich, "Solving the distal reward problem through linkage of STDP and dopamine signaling", in Cerebral Cortex Journal, pp. 2443-2452, Oct. 2007.
Z. Biolek, D. Biolek, V. Biolkova, "Spice Model of Memristor with nonlinear dopant drift", in Radioengineering Journal, vol. 18, No. 2, pp. 458-461, Jun. 2009.

(Continued)

*Primary Examiner* — Jeffrey A Gaffin
*Assistant Examiner* — David H Kim
(74) *Attorney, Agent, or Firm* — Rupit M. Patel

(57) ABSTRACT

The present disclosure proposes implementation of a three-memristor synapse where an adjustment of synaptic strength is based on Spike-Timing-Dependent Plasticity (STDP) with dopamine signaling.

27 Claims, 15 Drawing Sheets

OTHER PUBLICATIONS

M.D. Pickett, et. al., "Switching dynamics in titanium dioxide memristive devices", in Journal of Applied Physics, vol. 106, No. 7, pp. 074508-074508-6, Oct. 2009.

International Search Report and Written Opinion—PCT/US2011/043256—ISA/EPO—Dec. 14, 2011.

Rajendran J., et al.,"Memristor based programmable threshold logic array", Nanoscale Architectures (Nanoarch), 2010 IEEE/ACM International Symposium on, IEEE, Piscataway, NJ, USA, Jun. 17, 2010, pp. 5-10, XP031709601.

* cited by examiner (A)

(B)

(A)

(B)

US 8,433,665 B2

METHODS AND SYSTEMS FOR THREE-MEMRISTOR SYNAPSE WITH STDP AND DOPAMINE SIGNALING

FIELD

Certain embodiments of the present disclosure generally relate to neural system engineering and, more particularly, to designing a three-memristor synapse supporting the Spike-Timing-Dependent Plasticity (STDP) with dopamine signaling.

BACKGROUND

Neural system engineering has been attracting significant attention in recent years. Inspired by a biological brain with excellent flexibility and power efficiency, neural systems can be employed in many applications such as pattern recognition, machine learning and motor control. One of the biggest challenges of a practical neural system implementation is a hardware density. Neurons and synapses are the two fundamental components of a neural system whose quantity can be as high as billions. As an example, a human brain has approximately $10^{11}$ neurons, and the number of synapses is $10^3$ to $10^4$ times larger.

As a result, in order to implement practical neural systems, the synapse hardware is required to be extremely area and power eff. In recent years, a memristor element has been studied for implementation of a synapse because its cross-bar architecture can offer a very dense hardware solution. A single memristor with pulse width modulation (PWM) scheme was proposed in the prior art for implementation of the synapse with Spike-Timing-Dependent Plasticity (STDP) function. In order to have a reward-driving learning neural system, the synapse weight may need to be controlled by both the STDP mechanism and a dopamine signal. However, with the dopamine signal controlling, the synapse implementation may become very complex and not area/power efficient.

SUMMARY

Certain embodiments of the present disclosure provide a synaptic electrical circuit for connection between a pre-synaptic neuron circuit and a post-synaptic neuron circuit. The electrical circuit generally includes a plurality of memristors to adjust a strength of the connection, wherein a spike of the pre-synaptic neuron circuit followed by a spike of the post-synaptic neuron circuit triggers decreasing of resistance of a first of the memristors causing the strength of connection to increase, a second of the memristors being connected to the first memristor during the strength increase and a resistance of the second memristor was changed prior to the strength increase due to the spikes, and another spike of the post-synaptic neuron circuit followed by another spike of the pre-synaptic neuron circuit triggers increasing of resistance of the first memristor causing the strength of connection to decrease, a third of the memristors being connected to the first memristor during the strength decrease and a resistance of the third memristor was changed prior to the strength decrease due to the other spikes.

Certain embodiments of the present disclosure provide a method for controlling a synaptic connection between a pre-synaptic neuron circuit and a post-synaptic neuron circuit. The method generally includes increasing a strength of the connection by decreasing resistance of a first memristor of a plurality of memristors within the synaptic connection when a spike of the pre-synaptic neuron circuit is followed by a spike of the post-synaptic neuron circuit, wherein a second of the memristors is connected to the first memristor during the strength increase and a resistance of the second memristor was changed prior to the strength increase due to the spikes, and decreasing the strength of the connection by increasing resistance of the first memristor when another spike of the post-synaptic neuron circuit is followed by another spike of the pre-synaptic neuron circuit, wherein a third of the memristors is connected to the first memristor during the strength decrease and a resistance of the third memristor was changed prior to the strength decrease due to the other spikes.

Certain embodiments of the present disclosure provide an apparatus for controlling a synaptic connection between a pre-synaptic neuron circuit and a post-synaptic neuron circuit. The apparatus generally includes means for increasing a strength of the connection by decreasing resistance of a first memristor of a plurality of memristors within the synaptic connection when a spike of the pre-synaptic neuron circuit is followed by a spike of the post-synaptic neuron circuit, wherein a second of the memristors is connected to the first memristor during the strength increase and a resistance of the second memristor was changed prior to the strength increase due to the spikes, and means for decreasing the strength of the connection by increasing resistance of the first memristor when another spike of the post-synaptic neuron circuit is followed by another spike of the pre-synaptic neuron circuit, wherein a third of the memristors is connected to the first memristor during the strength decrease and a resistance of the third memristor was changed prior to the strength decrease due to the other spikes.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different technologies, system configurations, networks and protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Neural System

Figure 1:
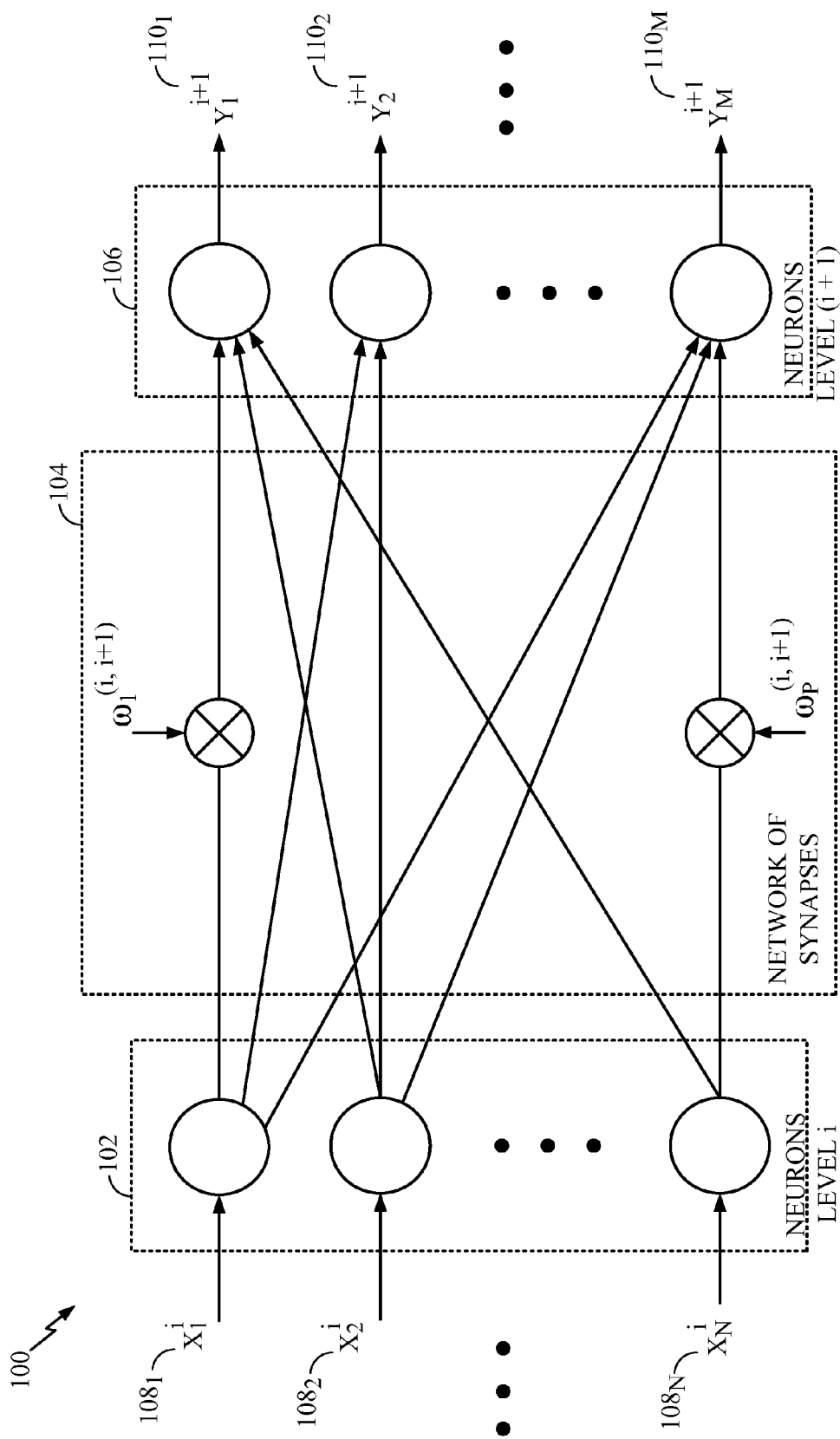
FIG. 1 illustrates an example neural system in accordance with certain embodiments of the present disclosure.

FIG. 1 illustrates an example neural system 100 with multiple levels of neurons in accordance with certain embodiments of the present disclosure. The neural system 100 may comprise a level of neurons 102 connected to another level of neurons 106 though a network of synaptic connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches a threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,j+1)}, \ldots, w_P^{(i,j+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, and motor control. Each neuron in the neural system 100 may be implemented as a neuron circuit. The neuron membrane charged to the threshold value initiating the output spike may be implemented as a capacitor that integrates an electrical current flowing through it.

For certain embodiments, the capacitor may be eliminated as the electrical current integrating device of the neuron circuit, and a much smaller memristor element may be used in its place. This approach may be applied in neuron circuits, as well as in various other applications where bulky capacitors are utilized as electrical current integrators. In addition, each of the synapses 104 may be implemented based on one or more memristor elements, wherein synaptic weight changes may relate to changes of the memristor resistances. With nanometer feature-sized memristors, the area of neuron circuit and synapses may be substantially reduced, which may make implementation of a very large-scale neural system hardware implementation practical.

Figure 2:
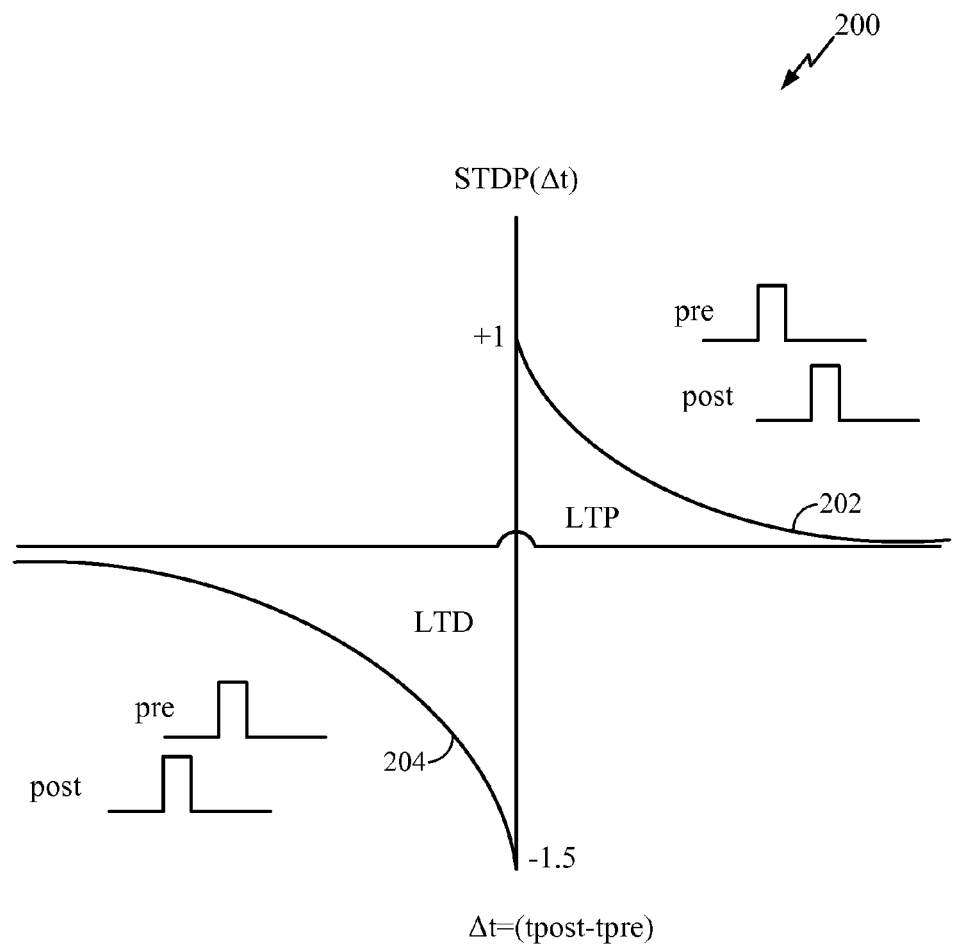
FIG. 2 illustrates an example graph diagram of a synaptic weight change as a function of relative timing of pre-synaptic and post-synaptic spikes in accordance with certain embodiments of the present disclosure.

The adjustment of synapse weights of the synapse network 104 during the training process may be based on the Spike-Timing-Dependent Plasticity (STDP). FIG. 2 illustrates an example graph diagram 200 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 202 of the graph 200. This weight increase can be referred as a Long-Term Potentiation (LTP) of the synapse. It can be observed from the graph portion 202 that the amount of LTP may decrease roughly exponentially as a function of difference between pre-synaptic and post-synaptic spike times. The reverse order of firing may reduce the synaptic weight, as illustrated in a portion 204 of the graph 200, causing a Long-Term Depression (LTD) of the synapse.

As illustrated in FIG. 2, the synaptic weight-training curve may be asymmetrical. The LTP weight increment represented by the graph portion 202 may be larger for short inter-spike intervals, but it may decay faster than the LTD weight increment. The dominance of LTD outside the causality window may cause weakening of synapses when pre-synaptic spikes occur randomly in time with respect to post-synaptic action potentials. Therefore, these random events may not consistently contribute evoking the synapses.

Figure 3:
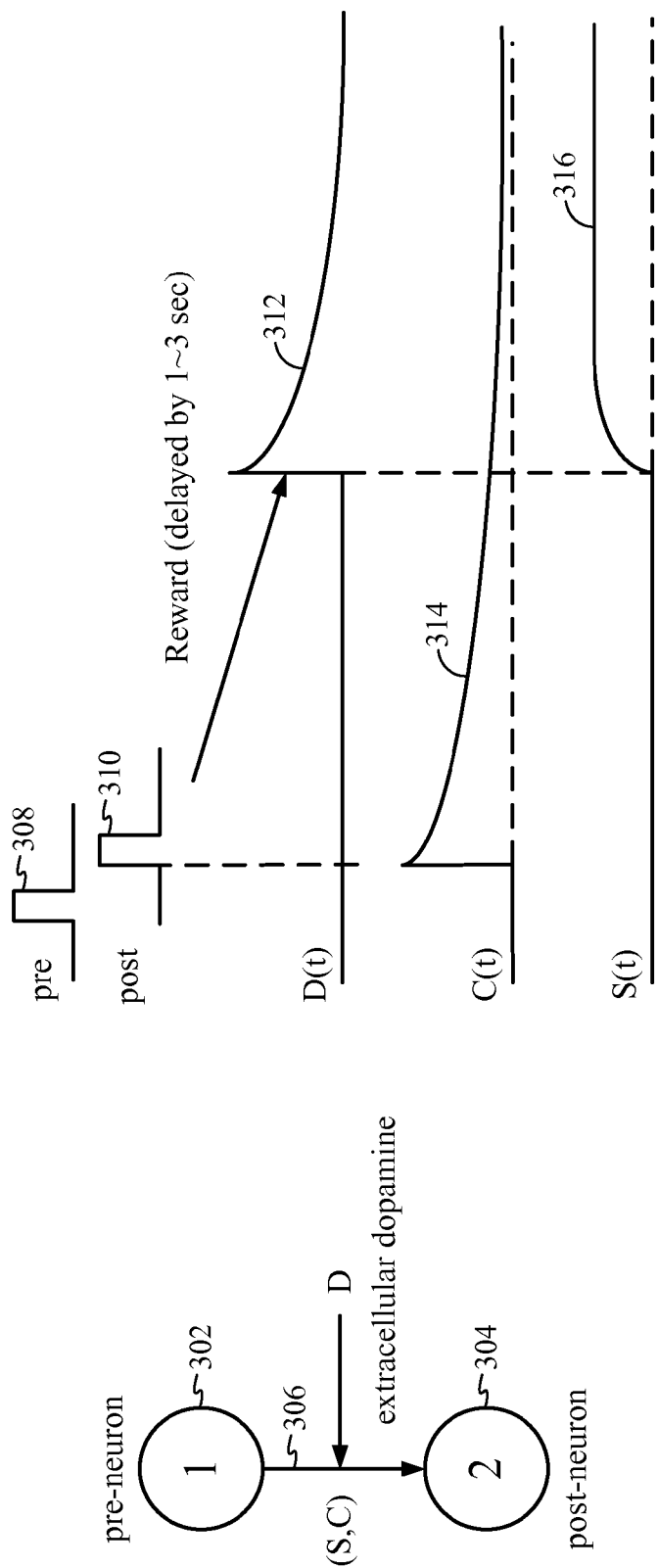
FIG. 3 illustrates an example of synapse weight change with eligibility trace and distal reward in accordance with certain embodiments of the present disclosure.

FIG. 3 illustrates an example of synapse weight change based on the STDP with distal reward in accordance with certain embodiments of the present disclosure. A pre-synaptic neuron 302 may be connected with a post-synaptic neuron 304 via a synapse 306. The state of synapse 306 may be described by two variables: synaptic strength (i.e., weight) S and activation C of an enzyme important for plasticity.

The pre-synaptic neuron 302 may fire a spike 308, which may be followed by another spike 310 fired by the post-synaptic neuron 304. After this sequence of spiking events, a reward to the synaptic connection 306 may be delivered in the form of a spike of extracellular dopamine (DA) with a random delay between 1 and 3 seconds from the sequence of pre- and post-synaptic spikes. A change of the extracellular concentration of DA over time may be represented as:

$$\dot{D}=-D/\tau_D+DA(t), \quad (1)$$

where D is the extracellular concentration of DA, $\tau_D$ is the decay time constant, and DA(t) models a source of DA due to activities of dopaminergic neurons. An exponentially decaying curve 312 from FIG. 3 illustrates the change of extracellular concentration of DA over time given by equation (1).

A change of the variable C over time may be given by:

$$\dot{C}=-C/\tau_C+STDP(\Delta t)\cdot\delta(t-t_{pre/post}), \quad (2)$$

where $\tau_C$ is the decay time constant, and $\delta(t)$ is the Dirac delta function. Firings of pre- and post-synaptic neurons 302-304 occurring at times $t_{pre/post}$, respectively, may change the variable C by the amount $STDP(\Delta t)$ depicted in FIG. 2, where $\Delta t=t_{post}-t_{pre}$ is the interspike interval. The variable C may exponentially decay to zero with the time constant 96 $_C$, as illustrated with a plot 314 in FIG. 3.

The decay rate of the curve 314 may control the sensitivity of plasticity to the delayed reward. The curve 314 may act as the eligibility trace for synaptic modification, as the variable C may allow change of the synaptic strength S when being gated by the extracellular concentration of DA (the variable D). Therefore, the change of synaptic strength may be given as:

$$\dot{S}=C\cdot D. \quad (3)$$

A plot 316 in FIG. 3 illustrates the change of synaptic strength defined by equation (3).

Exemplary Memristor Element

As aforementioned, synapses connecting neurons of a neural system may be implemented based on memristor elements. The memristor is sometimes referred to as the fourth elementary passive element. Its small feature size makes the memristor very attractive for large-scale hardware implementations. Possible future applications of memristors can include, among others, ultra-dense memory cells and neural computing.

Figure 4:
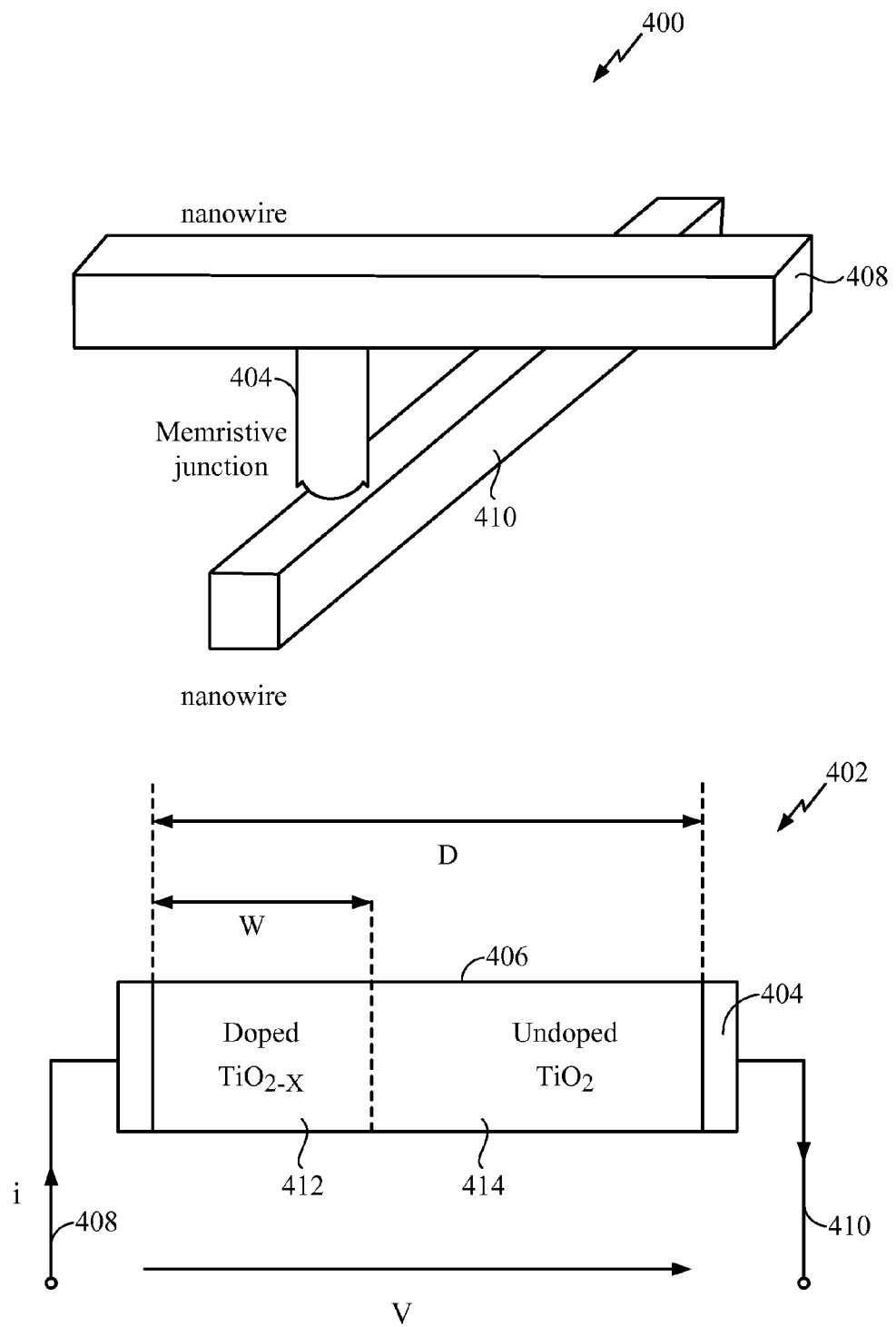
FIG. 4 illustrates an example memristor structure in accordance with certain embodiments of the present disclosure.

FIG. 4 illustrates a structure 400 and a model 402 of an example memristor element 404. The memristor 404 may comprise a two-layer thin film 406 of $TiO_2$, which may be sandwiched between two nano-wires 408-410 that serve as contacts. One layer (i.e., a layer 412) may be doped with oxygen vacancies and behave like semiconductor, while another un-doped layer 414 may function as an insulator. The overall memristor resistance $R_{mem}$ may depend on the boundary position of the two layers as:

$$R_{mem}=R_{on}\frac{W(t)}{D}+R_{off}\frac{D-W(t)}{D}, \quad (4)$$

where W is a width of the doped layer 412, D is a total length of the $TiO_2$ layer 406, $R_{on}$ and $R_{off}$ represent limit values of the memristor resistance for W=0 and W=D, respectively.

As an electrical current i passes through the memristor 404 over time, the current may modulate the memristor resistance by changing the doped layer width W as:

$$\frac{d}{dt}\left(\frac{W}{D}\right)=\frac{dx}{dt}=k\cdot i(t)\cdot f(x), \quad (5)$$

where $x=W/D$, $k=\mu_V R_{on}/D^2$, $f(x)=1-(2x-1)^{2P}$, $\mu_V$ represents a memristor dopant mobility, and P is a level of nonlinearity of the function $f(x)$.

Once the current i flows into the memristor 404 in one direction (i.e., from the wire 410 to the wire 408), it may reduce the width W of the doped layer 412 to zero and may saturate the memristor resistance to the largest possible value $R_{off}$. When direction of the current i is reverse (i.e., from the wire 408 to the wire 410), the doped layer 412 may tend to occupy the entire memristor width D, and the minimum memristor resistance of $R_{on}$ may be reached.

Figure 5:
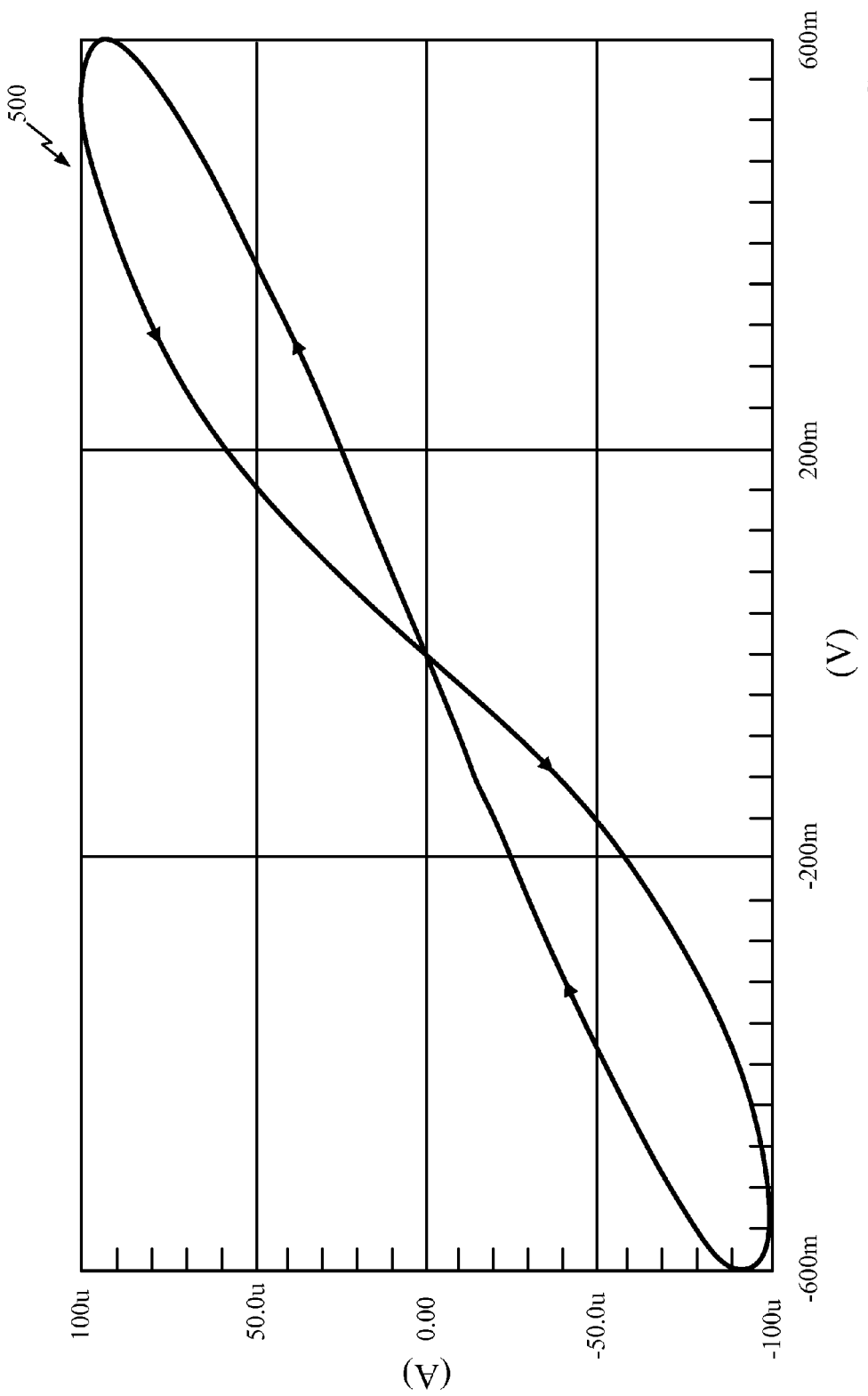
FIG. 5 illustrates an example current-voltage characteristic of a memristor element in accordance with certain embodiments of the present disclosure.

A model may be designed to simulate the aforementioned memristor behavior. FIG. 5 illustrates an example simulated electrical current-voltage (I-V) characteristic 500 of a memristor design in accordance with certain embodiments of the present disclosure. It can be observed from FIG. 5 that the memristor behavior can be described with the hysteresis I-V curve.

There may be no electrical current flowing through the memristor if there is no voltage applied across the memristor, as the hysteresis I-V curve 500 goes through the origin. This implies that the memristor may be a purely dissipative element. The increase of memristor current may cause the voltage across the memristor also to increase until a minimum memristance $R_{on}$ is reached. Then, the decrease of memristor current may cause the memristor voltage also to decrease because the memristance is at the constant and minimum level. When the current through the memristor flows in the opposite direction and increases, then the memristance may increase and the negative voltage across the memristor may increase. When the maximum memristance $R_{off}$ is reached, then the decrease of the memristor current flowing in this opposite direction may cause the negative memristor voltage also to decrease, as illustrated in FIG. 5.

It should be noted that the memristor element typically has asymmetric on/off switching behavior. The on-switching process relates to decreasing of the memristance towards the minimum level $R_{on}$, while the off-switching process relates to increasing of the memristance towards the maximum level $R_{off}$. The on-switching may be fast, while the off-switching may be slow and exponential.

Exemplary Three-Memristor Synapse with STDP and Dopamine Signaling

A synapse comprising a plurality of memristors is proposed in the present disclosure, and it may support the synapse strength adjustment based on the aforementioned STDP with dopamine signaling. One of the memristors may be utilized for implementing an LTP eligibility curve (the $R_{C\_LTP}$ memristor), while the other memristor may be used for implementing an LTD eligibility curve (the $R_{C\_LTD}$ memristor). The third memristor (the $R_S$ memristor) may operate as a synaptic connection between a pair of neurons with a variable strength depending on the memristance. By connecting the memristor $R_{C\_LTP}$ (or the memristor $R_{C\_LTD}$) with the memristor $R_S$ when a dopamine (DA) signal is high, the eligibility variable values may be efficiently copied to the synapse. In addition, the eligibility memristors $R_{C\_LTP}$ and $R_{C\_LTD}$ may be off-switching during decaying phases and generate exponentially decaying eligibility curves with large time constants. The proposed approach for synapse implementation may be both area and power efficient.

Figure 6:
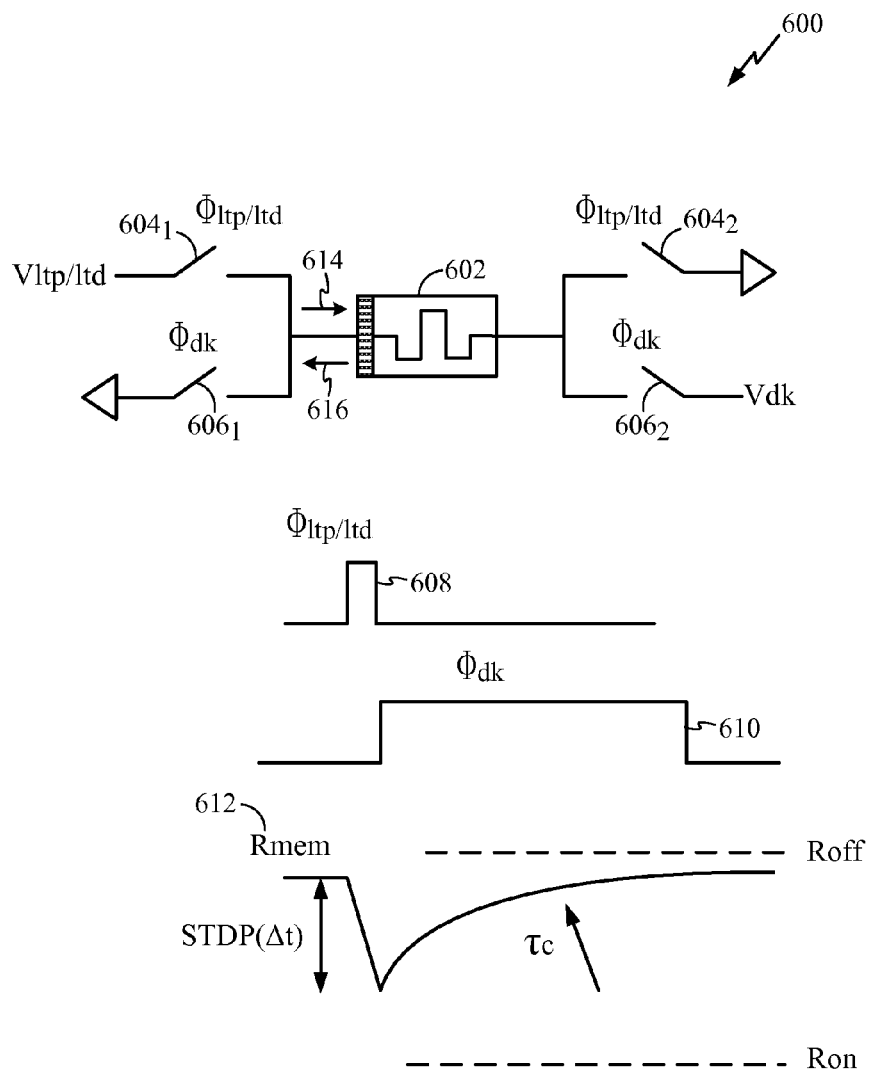
FIG. 6 illustrates an example memristor-based circuit for implementing an eligibility trace in accordance with certain embodiments of the present disclosure.

FIG. 6 illustrates an example circuit 600 with a memristor element 602 for implementing an eligibility trace in accordance with certain embodiments of the present disclosure. During an initial phase of LTP/LTD, a spike 608 of a signal $\Phi_{LTP/LTD}$ may be generated, and switches $604_1$-$604_2$ may be turned on. Therefore, during the spike 608, an electrical current may flow through the memristor 604 in a direction 614, and a memristance 612 of the memristor 602 may be sharply decreasing towards the minimum $R_{on}$ value (i.e., the on-switching may be performed).

On the other hand, during a decaying phase, a spike 610 of a signal $\Phi_{dk}$ may be generated, and switches $606_1$-$606_2$ may be turned on. In the same time, the signal $\Phi_{LTP/LTD}$ may be equal to logical "0" and the switches $604_1$-$604_2$ may be turned off. During the spike 610, an electrical current may flow through the memristor 604 in a direction 616 opposite to the direction 614, and the memristance 612 may be increasing slowly and exponentially with a large time constant, as illustrated in FIG. 6 (i.e., the off-switching may be performed).

By comparing the memristance curve 612 from FIG. 6 with the eligibility trace 314 from FIG. 3, it can be observed that the change of memristance may be inversely proportional to the eligibility trace (i.e., the synapse strength). Since the memristance 612 may correspond to a synaptic resistance that is inverse of the synaptic strength, the curve 612 may directly emulate the eligibility trace 314, and a single memristor element may be utilized to generate one eligibility trace (i.e., either the LTP or LTD eligibility trace) of a synaptic connection.

Figure 7:
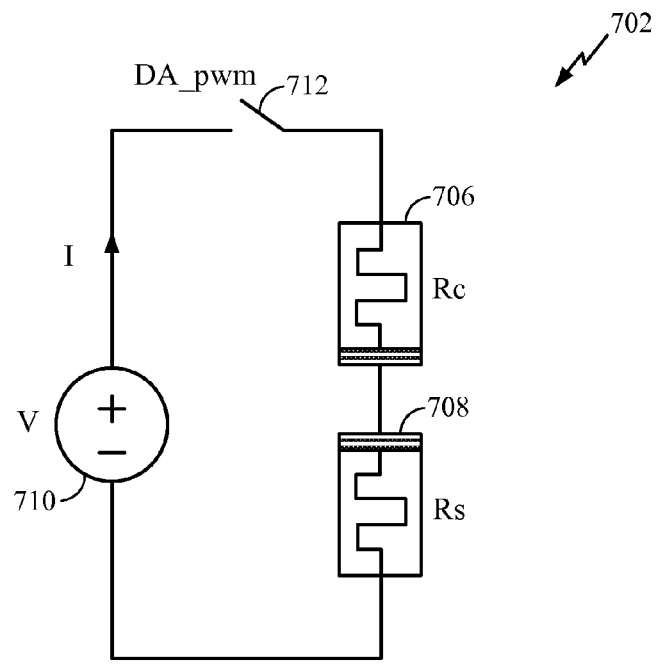
FIG. 7 illustrates examples of memristor-based circuits for synapse implementation in accordance with certain embodiments of the present disclosure.
Figure 7:
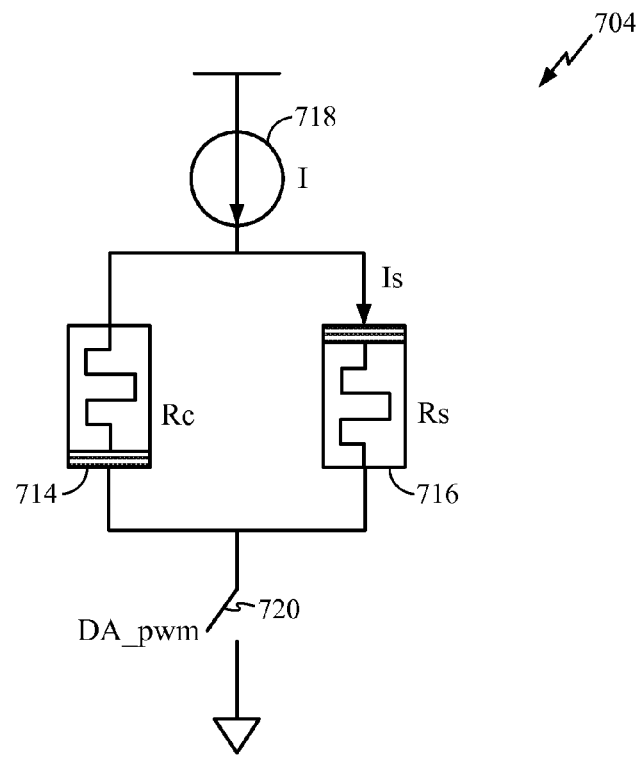

FIG. 7 illustrates examples of memristor-based circuits that may be used for synapse implementation in accordance with certain embodiments of the present disclosure. In particular, a circuit 702 from FIG. 7A may comprise two serial memristors 706-708 connected in parallel with a voltage source 710, and a circuit 704 from FIG. 7B may comprise two parallel memristors 714-716 serially connected with a source 718 of constant electrical current. Memristances $R_S$ of the both circuits 702 and 704 may be related to respective synaptic strengths, while changing of memristances $R_C$ in the both circuits may generate eligibility curves of the synapses. Switches 712 and 720 may be controlled by a pulse width modulated (PWM) signal, which may represent a change of concentration of DA following pre-synaptic/post-synaptic spikes (DA_pwm signals in the circuits 702 and 704).

In the circuit 702, the change of memristance 708 related to the change of synaptic strength may be proportional to an electrical current flowing through the circuit 702 when a pulse of the DA_pwm signal is generated:

$$\dot{R}_S \propto I \cdot DA\_pwm, \quad (6)$$

where $$I = \frac{V}{R_C + R_S} \cong \frac{V}{R_C}, \text{ if } R_C \gg R_S. \quad (7)$$

After including equation (7) into equation (6), the change of synaptic strength may be given as:

$$\dot{R}_S \propto \frac{1}{R_C} \cdot DA\_pwm. \quad (8)$$

Equation (8) may correspond to the change of synaptic strength defined by equation (3), wherein the inverse of modification of the memristance 706 over time (i.e., a curve $1/R_C(t)$) may represent the eligibility trace.

In the circuit 704, the change of memristance 716 related to the change of synaptic strength may be given as:

$$\dot{R}_S \propto I_S \cdot DA\_pwm, \quad (9)$$

where $$I_S = \frac{I \cdot R_C}{R_C + R_S} \cong \frac{R_C}{R_S} I, \text{ if } R_C \ll R_S. \quad (10)$$

After including equation (10) into equation (9), the change of synaptic strength may be given as:

$$\dot{R}_S \propto R_C \cdot DA\_pwm, \quad (11)$$

Equation (11) may correspond to the modification of synaptic strength defined by equation (3), wherein the change of memristance 714 over time (i.e., a curve $R_C(t)$) may represent the eligibility trace.

Figure 8:
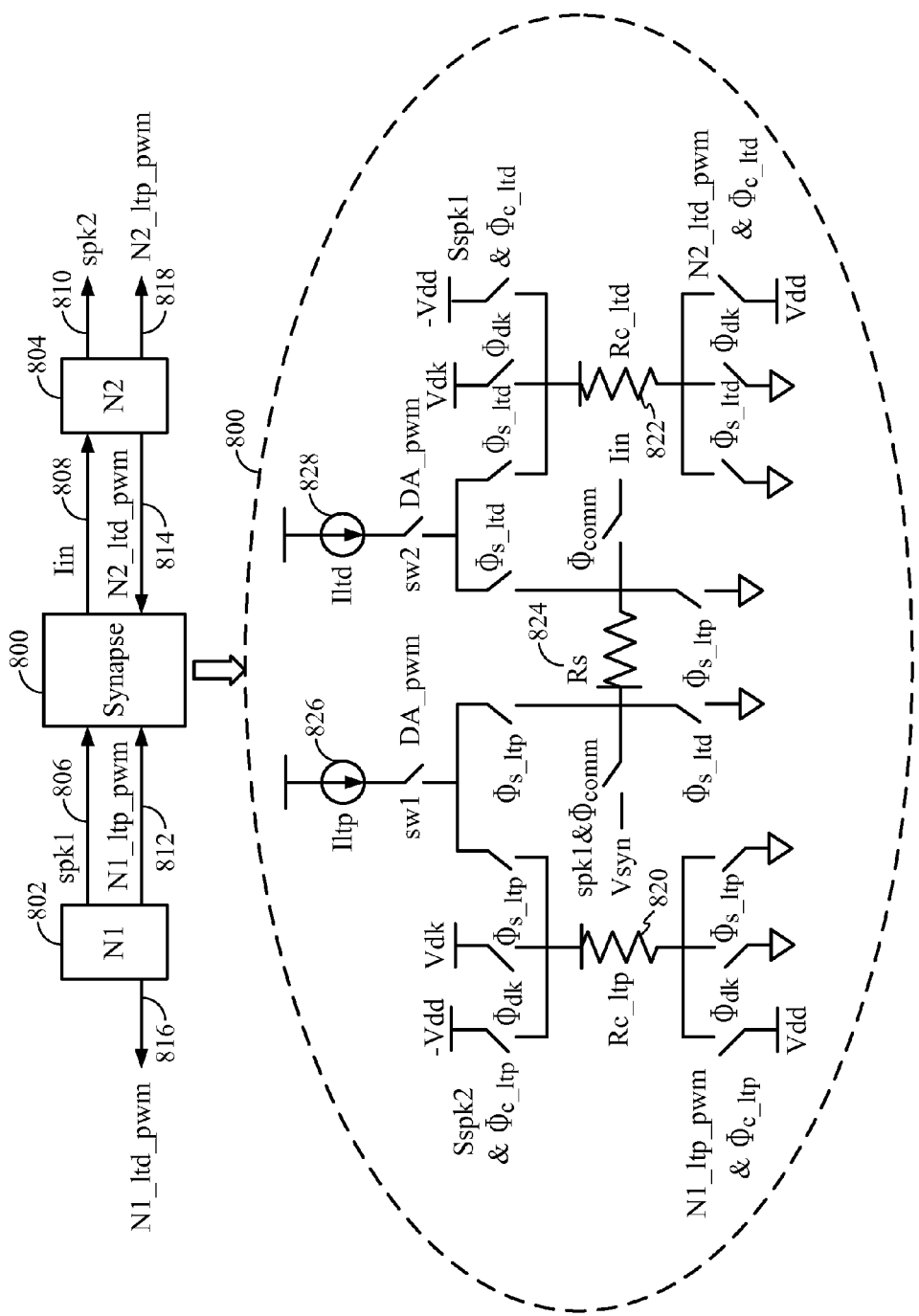
FIG. 8 illustrates an example of synapse comprising three memristors and current sources in accordance with certain embodiments of the present disclosure.

FIG. 8 illustrates a proposed hardware implementation of a synapse 800 connecting a pre-synaptic neuron 802 and a post-synaptic neuron 804 in accordance with certain embodiments of the present disclosure. The pre-synaptic neuron 802 may communicate a pre-synaptic spike signal 806 through the synapse 800 to an input current 808 and to the post-synaptic neuron 804. The neuron 804 may generate a post-synaptic spike 810, if the input current 808 causes the neuron's membrane potential to be above a threshold value, wherein a level of the input current 808 may depend on a strength of the synapse 800.

Further, the neuron 802 may generate a PWM-based signal 812 for triggering the LTP of the synapse 800, and the neuron 804 may generate a PWM-based signal 814 for triggering the LTD of the synapse 800. The neuron 802 may also generate a PWM-based signal 816 for triggering LTD of a synapse (not shown in FIG. 8) connected to the neuron 802, and the neuron 804 may generate a PWM-based signal 818 for triggering LTD of another synapse (not shown in FIG. 8) connected to the neuron 804.

In accordance to the circuit 704 from FIG. 7B, the synapse 800 may be implemented based on parallel connection of memristors, which may be then serially connected to electrical current sources. A memristor 820 illustrated in FIG. 8 may be utilized to generate an eligibility trace for the LTP of the synapse 800, and a memristor 822 may be utilized to generate an eligibility trace for the LTD of the synapse 800. On the other hand, the change of synapse strength may be based on modifying memristance $R_S$ of a memristor 824.

It should be noted that the memristors 820-822 may have small memristances relative to the memristance $R_S$. The small memristors 820-822 may bypass an electrical current flowing from the memristor 824, which may not be efficient in terms of power dissipation. In addition, during the generation of LTP and LTD eligibility traces, the small memristors 820-822 may be on-switching to their respective minimum resistances with small time constants. Therefore, decaying of the LTP and LTD eligibility traces may be too fast and may not be exponential. Further, the synapse 800 may comprise two electrical current sources 826 and 828 for the LTP and LTD, respectively, which may not be area efficient solution since these current sources cannot be shared by multiple synapses.

Figure 9:
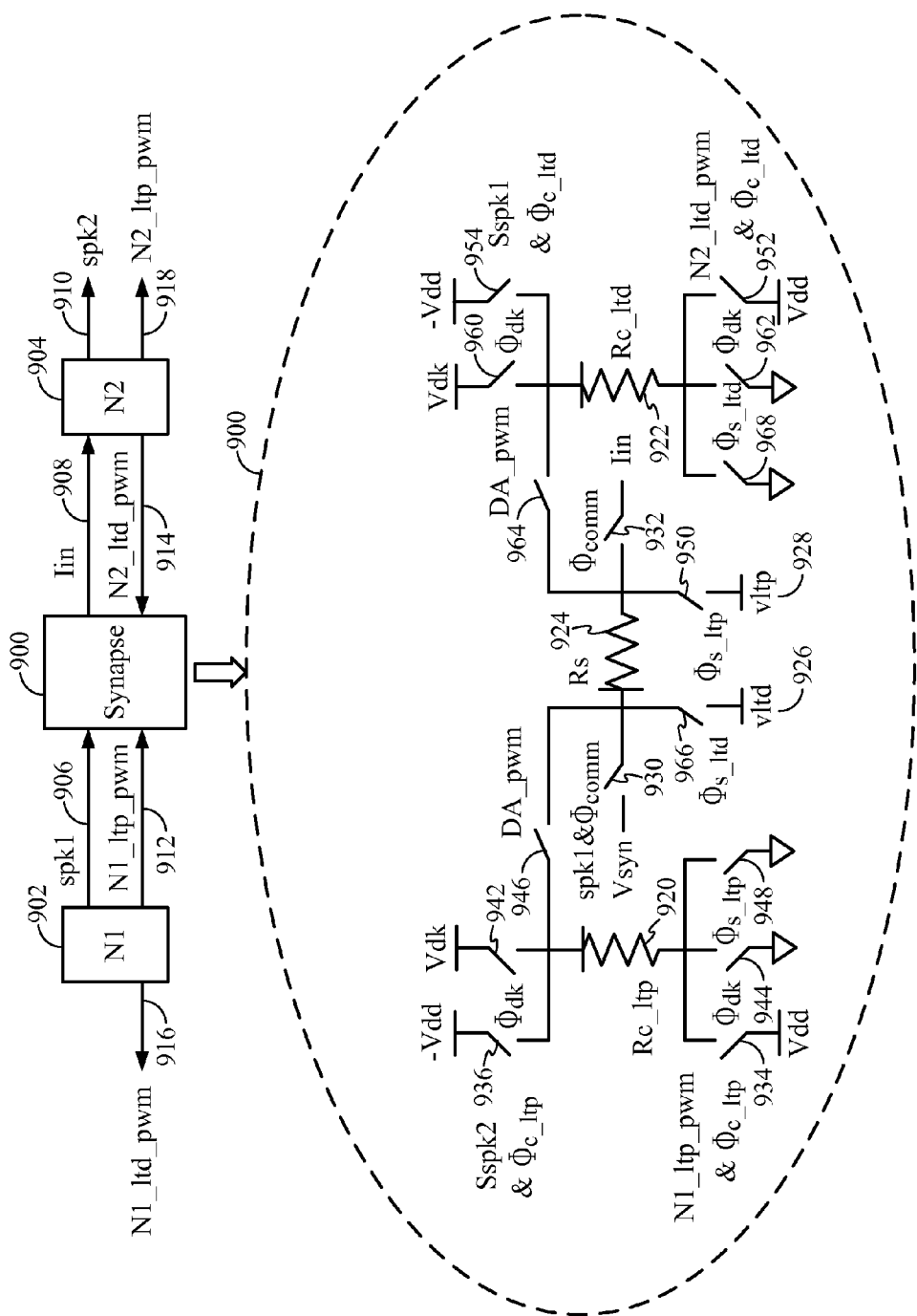
FIG. 9 illustrates an example of synapse comprising three memristors and voltage sources in accordance with certain embodiments of the present disclosure.

FIG. 9 illustrates a proposed hardware implementation of a synapse 900 connecting a pre-synaptic neuron 902 and a post-synaptic neuron 904 in accordance with certain embodiments of the present disclosure. The pre-synaptic neuron 902 may communicate a pre-synaptic spike signal 906 through the synapse 900 to an input current 908 and to the post-synaptic neuron 904. The neuron 904 may generate a post-synaptic spike 910, if the input current 908 causes the neuron's membrane potential to be above a threshold value, wherein a level of the input current 908 may depend on a strength of the synapse 900.

Further, the neuron 902 may generate a PWM-based signal 912 for triggering the LTP of the synapse 900, and the neuron 904 may generate a PWM-based signal 914 for triggering the LTD of the synapse 900. The neuron 902 may also generate a PWM-based signal 916 for triggering LTD of a synapse (not shown in FIG. 9) connected to the neuron 902, and the neuron 904 may generate a PWM-based signal 918 for triggering LTD of another synapse (not shown in FIG. 9) connected to the neuron 904.

In accordance to the circuit 702 illustrated in FIG. 7A, the synapse 900 may be implemented based on a serial connection of memristors, which may be then connected in parallel to a voltage source. A memristor 920 illustrated in FIG. 9 may be utilized to generate an eligibility trace for the LTP of the synapse 900, while a memristor 922 may be used to generate another eligibility trace for the LTD of the synapse 900. On the other hand, the modification of synapse strength may be based on the change of memristance $R_S$ of a memristor 924. It can be observed from FIG. 9 that the memristors 920 and 924 may be serially connected when appropriate switches in the synapse 900 are activated. This is also true for the memristors 922 and 924.

It should be noted that the memristors 920-922 may have large memristances relative to the memristor 924. The large memristances 920-922 may limit an electrical current flowing through the memristor 924, which may be power-efficient. Also, for generating the LTP and LTD eligibility traces, the large memristors 920-922 may be off-switching to their respective maximum resistances with large time constants. Therefore, decaying of the eligibility traces may be slow and exponential, as desired. Further, a voltage source 926 employed for the LTD and a voltage source 928 employed for the LTP may be shared among a plurality of synaptic electrical circuits, which may provide area efficiency for a network of synapses (e.g., the synaptic network 104 from FIG. 1). Therefore, the synapse implementation 900 from FIG. 9 may be a preferred synaptic implementation because of power and area advantages compared to the synapse implementation 800 illustrated in FIG. 8.

Figure 10:
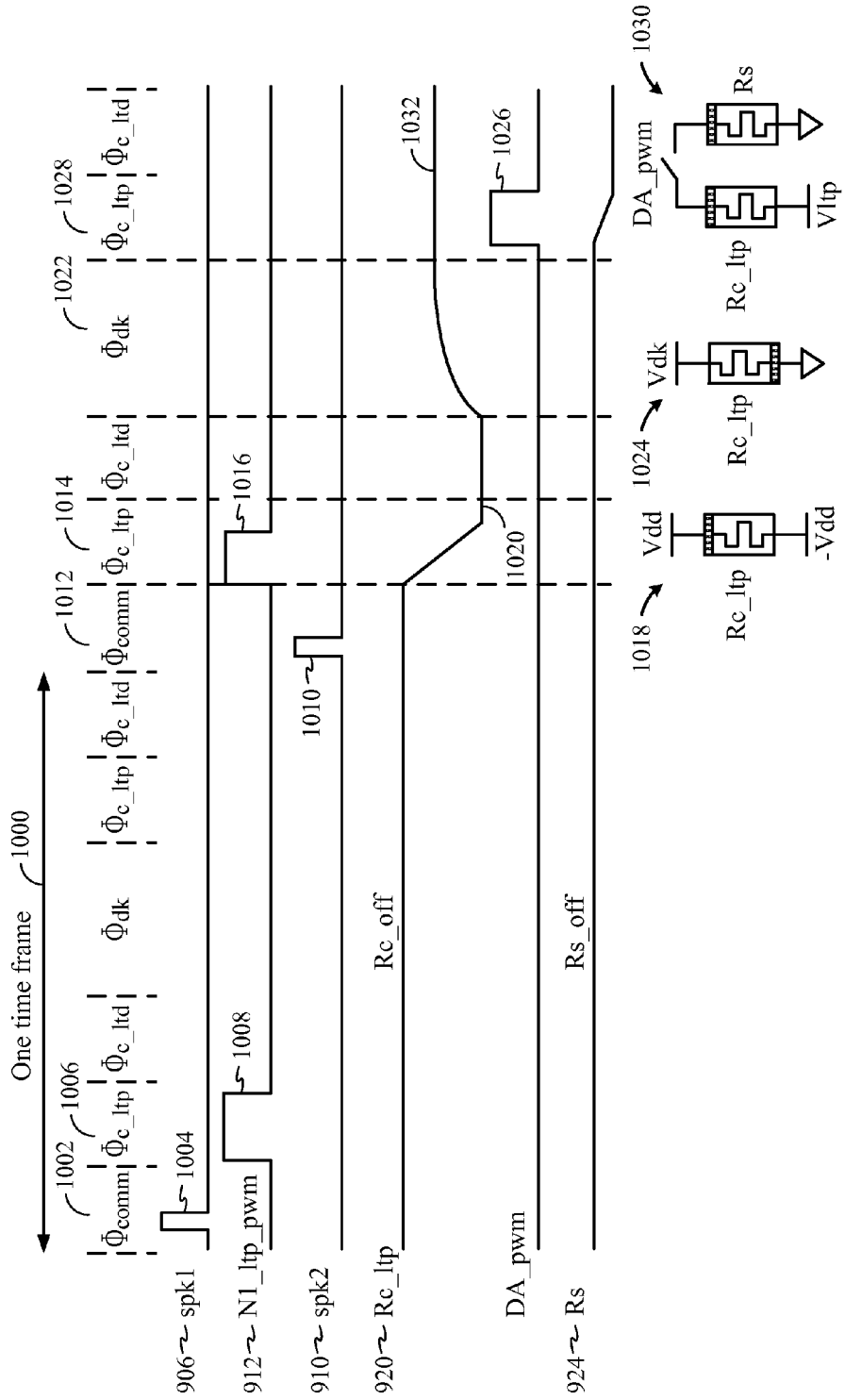
FIG. 10 illustrates an example timing for Long-Term Potentiation (LTP) of the synapse from FIG. 9 in accordance with certain embodiments of the present disclosure.

FIG. 10 illustrates an example timing for the LTP of the synapse 900 in accordance with certain embodiments of the present disclosure. The neuron 902 may generate a spike 1004 of the pre-synaptic spike signal 906 once the neuron membrane potential reaches its threshold level (a communication phase 1002 of a time frame 1000). The spike 1004 and a pulse $\Phi_{comm}$ generated during the communication phase 1002 may turn on switches 930-932. Then, an electrical current may flow through the memristor 924, which may contribute in generating the input current 908 of the post-synaptic neuron 904 (i.e., the spike 1004 may be communicated to the post-synaptic neuron 904). During the communication phase 1002, a voltage across the memristor 924 may be below the memristor's threshold level, and the memristance $R_S$ may not be changed. As illustrated in FIG. 10, during the communication phase 1002, the memristance $R_S$ may have the maximum value $R_{S\_off}$.

The communication phase 1002 may be followed by a potentiation phase 1006 associated with the memristor 920 (i.e., the potentiation phase of the LTP eligibility trace). A pulse 1008 of the PWM LTP signal 912 may be generated, and then a switch 934 may be turned on. Since the post-synaptic neuron 904 may not yet spike (i.e., a membrane potential of the neuron 904 may be still below its threshold level), a state of variable Sspk2 from FIG. 9 corresponding to the post-synaptic spike signal 910 may be low and a switch 936 may be off. Therefore, there may be no electrical current flowing through the memristor 920, and its memristance $R_{C\_LTP}$ may still be equal to the largest value $R_{C\_off}$, as illustrated in FIG. 10.

The neuron 904 may generate a spike 1010 of the post-synaptic spike signal 910 once the neuron membrane potential reaches its threshold level (a communication phase 1012). The spike 1010 may be communicated to another neuron (i.e., to a post-synaptic neuron of the neuron 904) through a synapse (not shown in FIG. 9) connected to the neuron 904. In addition, the spike 1010 may change the state of variable Sspk2 for potentiating of both the memristors 920 and 924. For example, the spike 1010 may turn on the switch 936, which may eventually cause that during another potentiation phase of the LTP eligibility trace the voltage drop across the memristor 920 is above the threshold level, and the memristance $R_{C\_LTP}$ may start to change.

The spike 1010 may be followed by another pulse 1016 of the PWM LTP signal 912 during the potentiation phase 1014 of the LTP eligibility trace. The pulse 1016 may cause the switch 934 to turn on, and the voltage drop across the memristor 920 may be now equal to $2 \cdot V_{dd}$, as illustrated by a circuit 1018 in FIG. 10. This voltage drop may be above the threshold level of the memristor 920, and an electrical current flowing through the memristor 920 may cause the memristance $R_{C\_LTP}$ to sharply decrease from $R_{C\_off}$ value during the phase 1014. As illustrated in FIG. 10, the memristance $R_{C\_LTP}$ may be decreasing until the PWM LTP signal becomes again equal to logical "0." Then, the switch 934 may be turned off, the memristor 920 may be in open circuit and the memristance $R_{C\_LTP}$ may preserve a value 1020 reached during the potentiation phase 1014.

Decaying of the LTP eligibility trace may occur during a phase 1022 when the off-switching of the memristance $R_{C\_LTP}$ may occur. During the decaying phase 1022, a pulse $\Phi_{dk}$ may turn on switches 942 and 944, and the memristor 920 may be part of a closed circuit 1024 illustrated in FIG. 10. The memristance $R_{C\_LTP}$ may be increasing slowly and exponentially since a time constant of the memristor 920 may be large (i.e., an electrical current flowing through the memristor 920 may be small due to the relative large memristance $R_{C\_LTP}$ and a relatively small voltage $V_{dk}$). It can be observed from FIG. 10 that the inverse of the modification of memristance $R_{C\_LTP}$ started after the post-synaptic spike 1010 may represent the LTP eligibility trace.

A change of extracellular concentration of DA in response to the sequence of pre- and post-synaptic spikes 1004 and 1010 may be emulated by a pulse 1026 of a PWM-based signal DA_pwm. The pulse 1026 may occur during a phase 1028 associated with the on-switching of the memristor 924 (i.e., the LTP of the synapse 900). As illustrated in FIG. 9, this pulse may turn on a switch 946 connecting the memristors 920 and 924. In the same time, a pulse $\Phi_{S\_LTP}$ generated during the LTP phase 1028 may turn on switches 948 and 950. A closed circuit 1030 comprising the memristor 924 illustrated in FIG. 10 may be then formed, and an electrical current flowing through the serial connection of memristors 920 and 924 may cause the memristance $R_S$ to decrease from its maximum value $R_{S\_off}$ (i.e., the LTP of the synapse 900 may occur).

It can be observed, based on the analysis of FIG. 10, that the proposed implementation of synapse illustrated in FIG. 9 may support the LTP with dopamine signaling. It should be also noted that during the LTP phase 1028, a voltage drop across the memristor 920 may be below the memristor's threshold level, and the memristance $R_{C\_LTP}$ may preserve its value 1032 reached during the decaying phase 1022.

Figure 11:
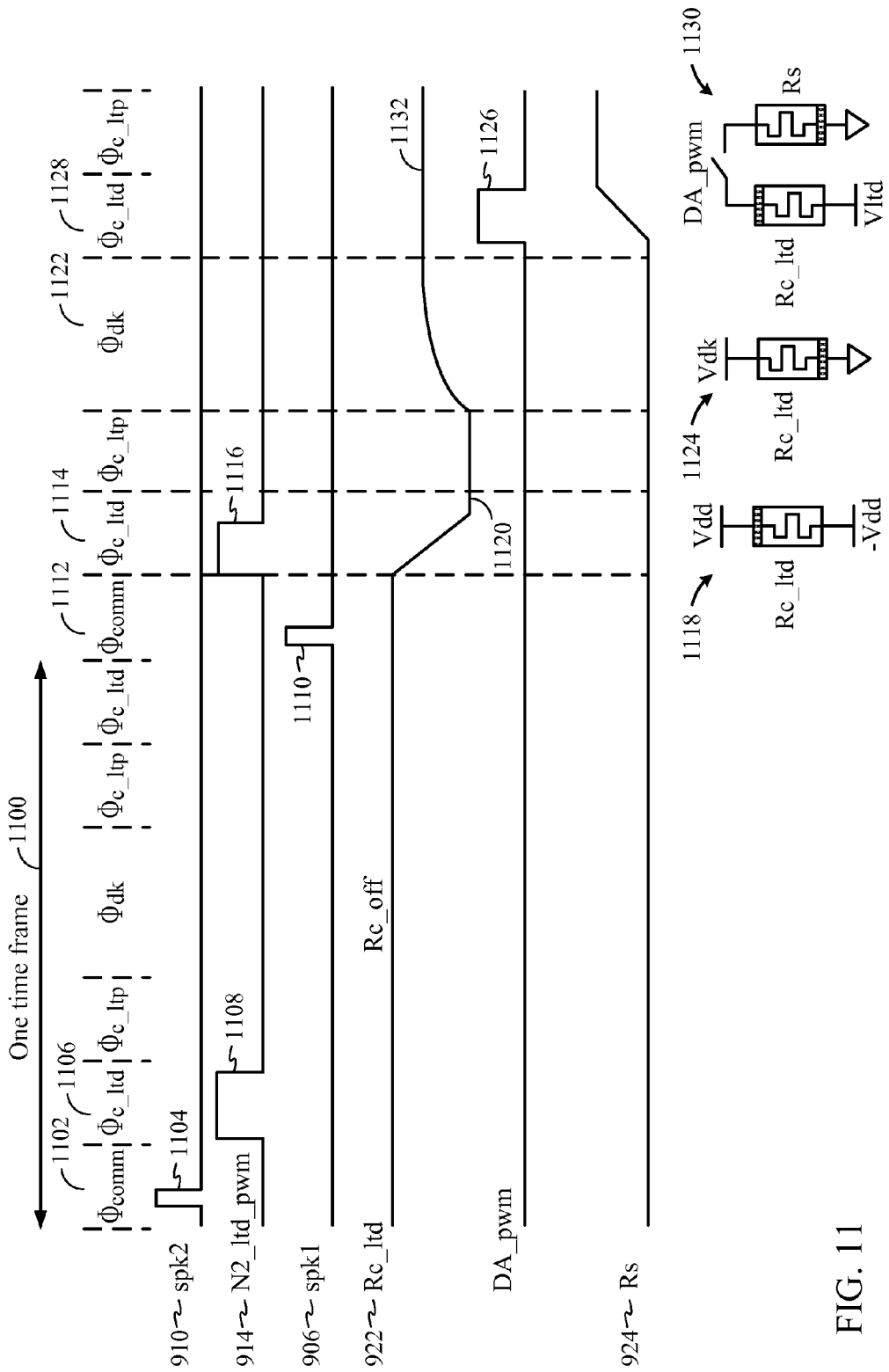
FIG. 11 illustrates an example timing for Long-Term Depression (LTD) of the synapse from FIG. 9 in accordance with certain embodiments of the present disclosure.

FIG. 11 illustrates an example timing for the LTD of the synapse 900 from FIG. 9 in accordance with certain embodiments of the present disclosure. During a communication phase 1102 of a time frame 1100, the post-synaptic neuron 904 may generate a spike 1104 of the post-synaptic spike signal 910. The spike 1104 may be communicated to another neuron (i.e., to a post-synaptic neuron of the neuron 904) through a synapse (not shown in FIG. 9) connected to the neuron 904. All the memristors 920-924 of the synapse 900 may be in open circuits, no electrical current flows through them, and their memristances may not change during the communication phase 1102.

The communication phase 1102 may be followed by a LTD phase 1106 associated with the memristor 922 (i.e., a depression phase of the LTD eligibility trace). A pulse 1108 of the PWM LTD signal 914 may be generated, and then a switch 952 may be turned on. Since the pre-synaptic neuron 902 may not yet spike (i.e., a membrane potential of the neuron 902 may be still below its threshold level), a state of variable Sspk1 from FIG. 9 corresponding to the pre-synaptic spike signal 906 may be low and a switch 954 may be off. Therefore, there may be no electrical current flowing through the memristor 922, and its memristance $R_{C\_LTD}$ may still be equal to the largest value $R_{C\_off}$, as illustrated in FIG. 11.

The neuron 902 may generate a spike 1110 of the pre-synaptic spike signal 906 once the neuron membrane potential reaches its threshold level (a communication phase 1112), which may be then communicated to the post-synaptic neuron 904 through the synapse 900. The spike 1110 and a pulse $\Phi_{comm}$ generated during the communication phase 1112 may turn on switches 930-932. Then, an electrical current may flow through the memristor 924, which may contribute in generating the input current 908 of the post-synaptic neuron 904. During the communication phase 1112, a voltage across the memristor 924 may be below the memristor's threshold level, and the memristance $R_S$ may not be changed. Further, the spike 1110 may change the state of variable Sspk1, which may turn on the switch 954. This may eventually cause that, during another pulse of the PMW LTD signal 914, the LTD eligibility trace may start to be generated because the voltage drop across the memristor 922 may be above the threshold level.

The other pulse of the PWM LTD signal 914 (i.e., a pulse 1116) may occur during a phase 1114 related to the start of LTD eligibility trace. The pulse 1116 may cause the switch 952 to turn on, and the voltage drop across the memristor 922 may be now equal to $2 \cdot V_{dd}$, as illustrated by a circuit 1118 in FIG. 11. This voltage drop may be above the threshold level of the memristor 922, and an electrical current flowing through the memristor 922 may cause the memristance $R_{C\_LTD}$ to sharply decrease from the $R_{C\_off}$ value. As illustrated in FIG. 11, the memristance $R_{C\_LTD}$ may be decreasing until the PWM LTD signal becomes again equal to logical "0." Then, the switch 952 may be turned off, the memristor 922 may be in an open circuit and the memristance $R_{C\_LTD}$ may preserve a value 1120 reached during the phase 1114.

Decaying of the LTD eligibility trace may occur during a phase 1122 when the off-switching of the memristance $R_{C\_LTD}$ may be performed. During the decaying phase 1122, a pulse $\Phi_{dk}$ may turn on switches 960-962, and the memristor 922 may be part of a closed circuit 1124 illustrated in FIG. 11. The memristance $R_{C\_LTD}$ may be increasing slowly and exponentially since a time constant of the memristor 922 may be large (i.e., an electrical current flowing through the memristor 922 may be small due to the relative large memristance $R_{C\_LTD}$ and the relatively small voltage $V_{dk}$). It can be observed from FIG. 11 that the inverse of the modification of memristance $R_{C\_LTD}$ started after the sequence of post- and pre-synaptic spikes 1102 and 1110 may represent the LTD eligibility trace.

A change of extracellular concentration of DA in response to the sequence of post- and pre-synaptic spikes 1104 and 1110 may be emulated by a pulse 1126 of a PWM based signal DA_pwm. The pulse 1126 may occur during a phase 1128 associated with the off-switching of the memristor 924 (i.e., the LTD of the synapse 900), and this pulse may turn on a switch 964 connecting the memristors 922 and 924. In the same time, a pulse $\Phi_{S\_LTD}$ generated during the LTD phase 1128 may turn on switches 966 and 968. A closed circuit 1130 illustrated in FIG. 11 comprising the memristor 924 may be then formed, and an electrical current flowing through the serial connection of memristors 922 and 924 may cause the memristance $R_S$ to increase (i.e., the LTD of the synapse 900 may occur). It should be also noted that during the LTD phase 1128, a voltage drop across the memristor 922 may be below the memristor's threshold level, and the memristance $R_{C\_LTD}$ may preserve its value 1132 reached during the decaying phase 1122.

It can be concluded, based on the analysis of FIG. 11, that the proposed implementation of synapse from FIG. 9 may support the LTD with dopamine signaling. Therefore, according to the timing diagrams from FIGS. 10-11, the synapse 900 comprising three memristors may efficiently support the STDP-based strength adjustment with dopamine signaling.

Figure 12:
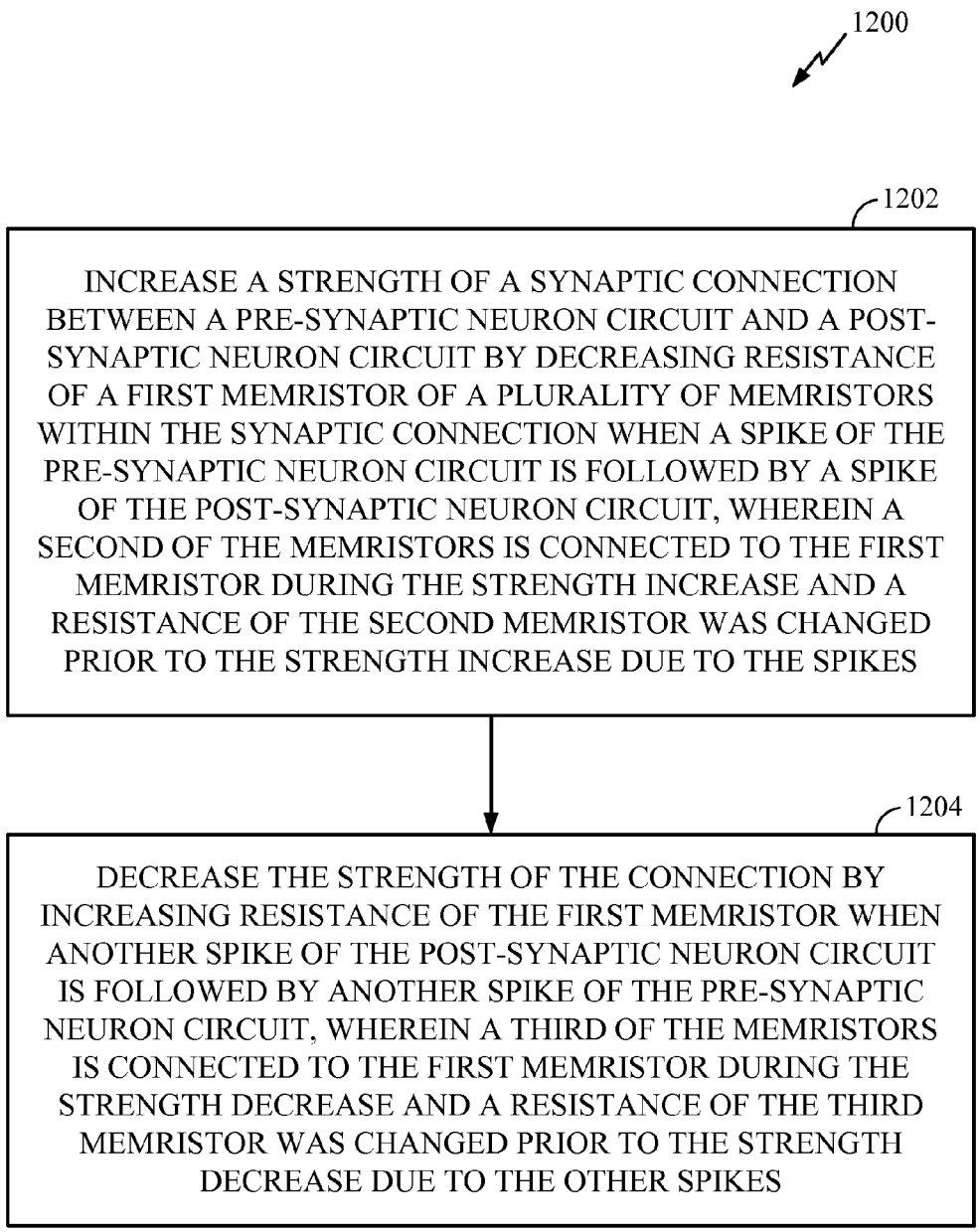
FIG. 12 illustrates example operations for implementing a three-memristor synapse for supporting Spike-Timing-Dependent Plasticity (STDP) with dopamine signaling in accordance with certain embodiments of the present disclosure.

FIG. 12 illustrates example operations 1200 for controlling the proposed three-memristor synaptic connection 900 between the pre-synaptic neuron circuit 902 and the post-synaptic neuron circuit 904 in accordance with certain embodiments of the present disclosure. At 1202, a strength of the connection may be increased by decreasing resistance of a first memristor of a plurality of memristors within the synaptic connection when a spike of the post-synaptic neuron circuit follows a spike of the pre-synaptic neuron circuit. A second of the memristors may be connected to the first memristor during the strength increase, and a resistance of the second memristor may be changed prior to the strength increase due to the spikes. At 1204, the strength of the connection may be decreased by increasing resistance of the first memristor when another spike of the pre-synaptic neuron circuit follows another spike of the post-synaptic neuron circuit. A third of the memristors may be connected to the first memristor during the strength decrease, and a resistance of the third memristor may be changed prior to the strength decrease due to the other spikes.

Exemplary Array of Three-Memristor Synapses

Figure 13:
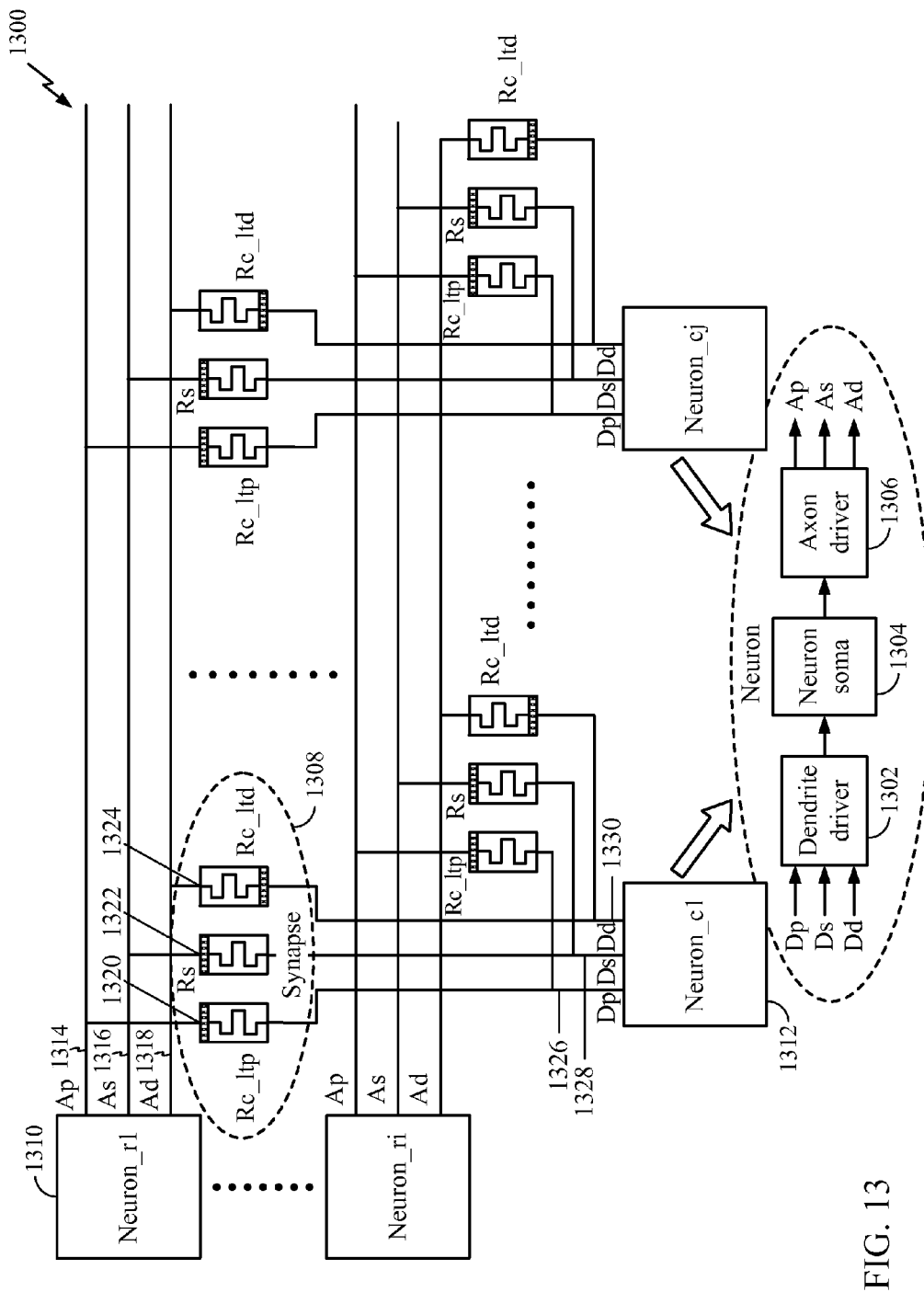
FIG. 13 illustrates an example array of three-memristor synapses connecting an array of neurons in accordance with certain embodiments of the present disclosure.

Three-memristor synapses from above may be utilized to connect an array of neurons, as illustrated in FIG. 13. Each neuron in an array 1300 may comprise a dendrite driver 1302, a neuron soma 1304 and an axon driver 1306. As illustrated in FIG. 13, the dendrite driver 1302 may be connected to the neuron soma 1304, and the neuron soma may be interfaced on the other end with the axon driver 1306.

A synapse 1308 comprising three memristors 1320-1324, which may correspond to the synapse 900 from FIG. 9, may connect a pre-synaptic neuron 1310 with a post-synaptic neuron 1312. An output 1314 of an axon driver within the neuron 1310 may be connected through the memristor 1320 to an input 1326 of a dendrite driver within the neuron 1312. This connection may provide generation of an LTP eligibility trace of the synapse 1308.

Strength of the synapse 1308 may be related to a memristance $R_S$ of the memristor 1322 connecting an output 1316 of the axon driver within the neuron 1310 to an input 1328 of the dendrite driver within the neuron 1312. During the LTP of the synapse 1308, after the LTP eligibility trace is being generated, the memristance $R_S$ of the memristor 1322 may decrease, and the synaptic connection between the neurons 1310 and 1312 may be stronger.

For generating an LTD eligibility trace of the synapse 1308, an output 1318 of the axon driver within the neuron 1310 may be connected through the memristor 1324 to an input 1330 of a dendrite driver within the neuron 1312. During the LTD of the synapse 1308, after the LTD eligibility trace is being generated, the memristance $R_S$ of the memristor 1322 may increase, and the synaptic connection between the neurons 1310 and 1312 may be weaker.

Figure 14:
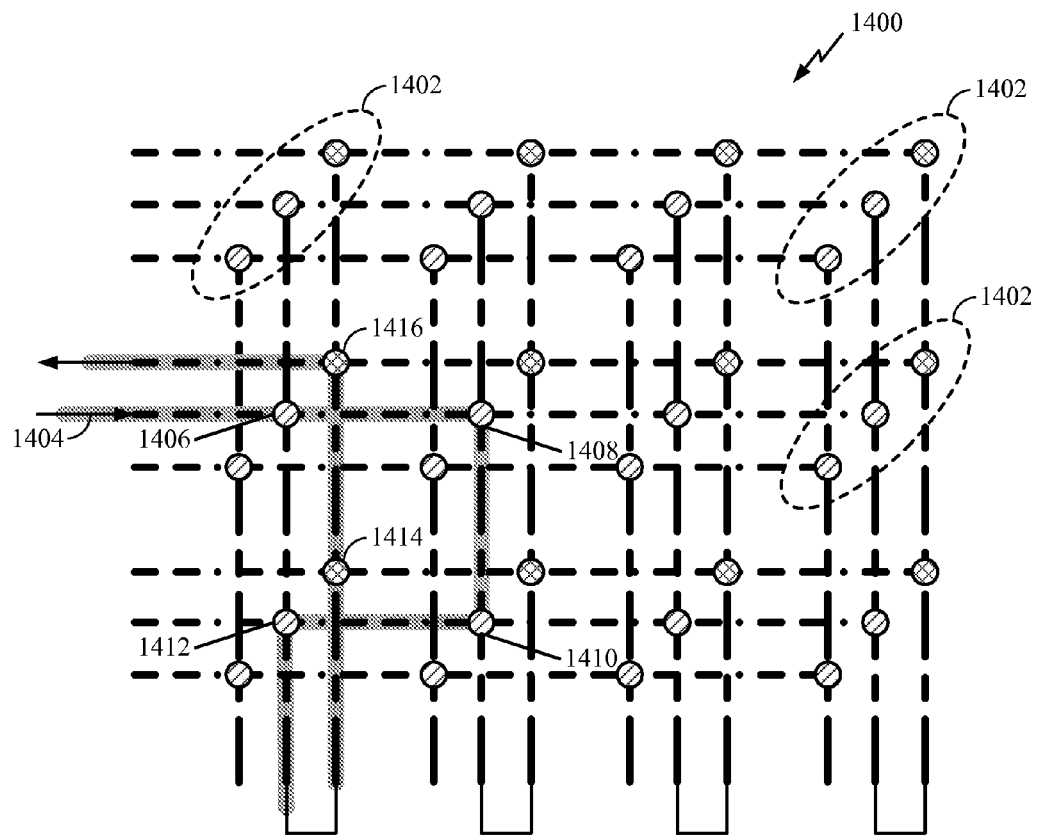
FIG. 14 illustrates an example of neural cross-bar architecture with synapses based on three-terminal memristors in accordance with certain embodiments of the present disclosure.
Figure 14:
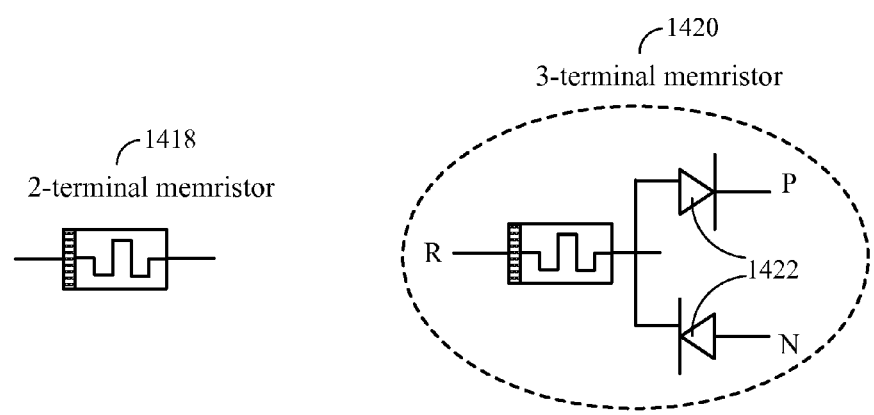

FIG. 14A illustrates an example cross-bar architecture 1400 where array of neurons may be efficiently connected via three-memristor synapses 1402. A spike 1404 generated by a neuron (not illustrated in FIG. 14) may be communicated to a synaptic memristor 1406, then to a synaptic memristor 1408, a synaptic memristor 1410 and a synaptic memristor 1412. However, this spike information may be incorrectly passed to memristors 1414 and 1416 (i.e., memristors associated with LTD or LTP eligibility traces) and then returned to the same neuron that generated the spike 1404.

To eliminate possible false paths in cross-bar neural architectures, two-terminal memristors 1418 illustrated in FIG. 14B may be replaced with three-terminal memristors 1420. A pair of diodes 1422 of the memristor 1420 may control direction of an electrical current flowing through the memristor, and may prevent the current to flow in an undesired direction. In the preferred embodiment of the present disclosure, updating of memristances $R_S$ of the three-terminal memristors in the neural cross-bar architectures (i.e., modification of synaptic strengths) may be performed row by row, instead of modifying strengths of synapses located in the same columns of the neural cross-bar architecture.

The present disclosure proposes hardware implementation of a three-memristor synapse for the STDP with dopamine signaling. The LTD and LTP eligibility traces may decay slowly and exponentially thanks to appropriately chosen memristances and a low voltage drop across the memristors during the decaying phase. This approach may be also power efficient. Furthermore, the proposed implementation of the three-memristor synapse may be area efficient since no RC network/counters are utilized (i.e., large bulky capacitors may be avoided for emulating slowly decaying curves). In addition, the serial connection of synaptic memristors with a voltage source shared by multiple synapses may allow area efficient neural cross-bar architectures. The proposed neural cross-bar architecture may comprise simple logic making this solution power efficient.

Figure 12A:
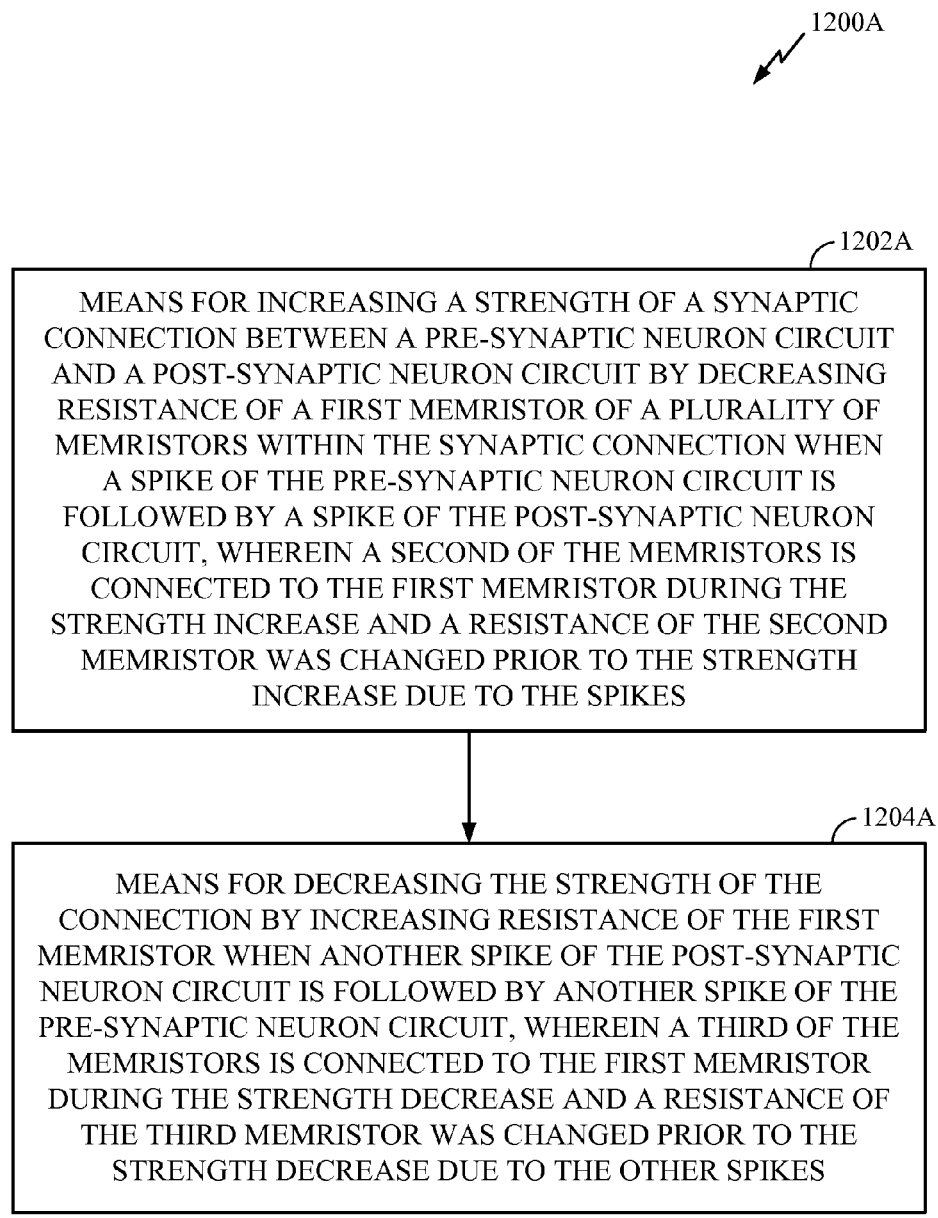
FIG. 12A illustrates example components capable of performing the operations illustrated in FIG. 12.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 1200 illustrated in FIG. 12 correspond to components 1200A illustrated in FIG. 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and/or a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims. While the foregoing is directed to embodiments of the present disclosure, other and further embodiments of the disclosure may be devised without departing from the basic scope thereof, and the scope thereof is determined by the claims that follow.

What is claimed is:

1. A synaptic electrical circuit for connection between a pre-synaptic neuron circuit and a post-synaptic neuron circuit, comprising:
   a plurality of memristors to adjust a strength of the connection, wherein
   a spike of the pre-synaptic neuron circuit followed by a spike of the post-synaptic neuron circuit triggers decreasing of resistance of a first of the memristors causing the strength of connection to increase, a second of the memristors being connected to the first memristor during the strength increase and a resistance of the second memristor was changed prior to the strength increase due to the spikes, and
   another spike of the post-synaptic neuron circuit followed by another spike of the pre-synaptic neuron circuit triggers increasing of resistance of the first memristor causing the strength of connection to decrease, a third of the memristors being connected to the first memristor during the strength decrease and a resistance of the third memristor was changed prior to the strength decrease due to the other spikes.

2. The electrical circuit of claim 1, wherein:
   the first memristor is serially connected with the second memristor during the strength increase due to a pulse of a signal being input to the synaptic electrical circuit and generated based on the spikes,
   the resistance of the first memristor decreases as an electrical current flows through the first and second memristors, and
   a voltage drop across the serial connection of the first and second memristors is constant during the flow of electrical current and based on a voltage source.

3. The electrical circuit of claim 2, wherein the synaptic electrical circuit shares the same voltage source with one or more other synaptic electrical circuits.

4. The electrical circuit of claim 1, wherein:
   the first memristor is serially connected with the third memristor during the strength decrease due to a pulse of a signal being input to the synaptic electrical circuit and generated based on the other spikes,
   the resistance of the first memristor increases as an electrical current flows through the first and third memristors, and
   a voltage drop across the serial connection of the first and third memristors is constant during the flow of electrical current and based on a voltage source.

5. The electrical circuit of claim 1, wherein:
   the first memristor is connected in parallel with the second memristor during the strength increase, and
   the parallel connection of the first and second memristors is serially connected with a source of a constant electrical current due to a pulse of a signal being input to the synaptic electrical circuit and generated based on the spikes.

6. The electrical circuit of claim 1, wherein:
   the first memristor is connected in parallel with the third memristor during the strength decrease, and
   the parallel connection of the first and third memristors is serially connected with a source of a constant electrical current due to a pulse of a signal being input to the synaptic electrical circuit and generated based on the other spikes.

7. The electrical circuit of claim 1, wherein the resistance of the second memristor was changed exponentially with a large time constant before the strength decrease.

8. The electrical circuit of claim 1, wherein the resistance of the third memristor was changed exponentially with a large time constant before the strength increase.

9. The electrical circuit of claim 1, further comprising:
   a pair of diodes connected to each of the memristors for controlling a direction of an electrical current flowing through that memristor.

10. A method for controlling a synaptic connection between a pre-synaptic neuron circuit and a post-synaptic neuron circuit, comprising:

increasing a strength of the connection by decreasing resistance of a first memristor of a plurality of memristors within the synaptic connection when a spike of the pre-synaptic neuron circuit is followed by a spike of the post-synaptic neuron circuit, wherein a second of the memristors is connected to the first memristor during the strength increase and a resistance of the second memristor was changed prior to the strength increase due to the spikes; and decreasing the strength of the connection by increasing resistance of the first memristor when another spike of the post-synaptic neuron circuit is followed by another spike of the pre-synaptic neuron circuit, wherein a third of the memristors is connected to the first memristor during the strength decrease and a resistance of the third memristor was changed prior to the strength decrease due to the other spikes.

11. The method of claim 10, wherein:

the first memristor is serially connected with the second memristor during the strength increase due to a pulse of a signal being input to the synaptic electrical circuit and generated based on the spikes, the resistance of the first memristor decreases as an electrical current flows through the first and second memristors, and a voltage drop across the serial connection of the first and second memristors is constant during the flow of electrical current and based on a voltage source.

12. The method of claim 11, wherein the synaptic electrical circuit shares the same voltage source with one or more other synaptic electrical circuits.

13. The method of claim 10, wherein:

the first memristor is serially connected with the third memristor during the strength decrease due to a pulse of a signal being input to the synaptic electrical circuit and generated based on the other spikes, the resistance of the first memristor increases as an electrical current flows through the first and third memristors, and a voltage drop across the serial connection of the first and third memristors is constant during the flow of electrical current and based on a voltage source.

14. The method of claim 10, wherein:

the first memristor is connected in parallel with the second memristor during the strength increase, and the parallel connection of the first and second memristors is serially connected with a source of a constant electrical current due to a pulse of a signal being input to the synaptic electrical circuit and generated based on the spikes.

15. The method of claim 10, wherein:

the first memristor is connected in parallel with the third memristor during the strength decrease, and the parallel connection of the first and third memristors is serially connected with a source of a constant electrical current due to a pulse of a signal being input to the synaptic electrical circuit and generated based on the other spikes.

16. The method of claim 10, wherein the resistance of the second memristor was changed exponentially with a large time constant before the strength decrease.

17. The method of claim 10, wherein the resistance of the third memristor was changed exponentially with a large time constant before the strength increase.

18. The method of claim 10, further comprising:

connecting a pair of diodes to each of the memristors to control a direction of an electrical current flowing through that memristor.

19. An apparatus for controlling a synaptic connection between a pre-synaptic neuron circuit and a post-synaptic neuron circuit, comprising:

means for increasing a strength of the connection by decreasing resistance of a first memristor of a plurality of memristors within the synaptic connection when a spike of the pre-synaptic neuron circuit is followed by a spike of the post-synaptic neuron circuit, wherein a second of the memristors is connected to the first memristor during the strength increase and a resistance of the second memristor was changed prior to the strength increase due to the spikes; and means for decreasing the strength of the connection by increasing resistance of the first memristor when another spike of the post-synaptic neuron circuit is followed by another spike of the pre-synaptic neuron circuit, wherein a third of the memristors is connected to the first memristor during the strength decrease and a resistance of the third memristor was changed prior to the strength decrease due to the other spikes.

20. The apparatus of claim 19, wherein:

the first memristor is serially connected with the second memristor during the strength increase due to a pulse of a signal being input to the synaptic electrical circuit and generated based on the spikes, the resistance of the first memristor decreases as an electrical current flows through the first and second memristors, and a voltage drop across the serial connection of the first and second memristors is constant during the flow of electrical current and based on a voltage source.

21. The apparatus of claim 20, wherein the synaptic electrical circuit shares the same voltage source with one or more other synaptic electrical circuits.

22. The apparatus of claim 19, wherein:

the first memristor is serially connected with the third memristor during the strength decrease due to a pulse of a signal being input to the synaptic electrical circuit and generated based on the other spikes, the resistance of the first memristor increases as an electrical current flows through the first and third memristors, and a voltage drop across the serial connection of the first and third memristors is constant during the flow of electrical current and based on a voltage source.

23. The apparatus of claim 19, wherein:

the first memristor is connected in parallel with the second memristor during the strength increase, and the parallel connection of the first and second memristors is serially connected with a source of a constant electrical current due to a pulse of a signal being input to the synaptic electrical circuit and generated based on the spikes.

24. The apparatus of claim 19, wherein:

the first memristor is connected in parallel with the third memristor during the strength decrease, and the parallel connection of the first and third memristors is serially connected with a source of a constant electrical current due to a pulse of a signal being input to the synaptic electrical circuit and generated based on the other spikes.

25. The apparatus of claim 19, wherein the resistance of the second memristor was changed exponentially with a large time constant before the strength decrease.

26. The apparatus of claim 19, wherein the resistance of the third memristor was changed exponentially with a large time constant before the strength increase.

27. The apparatus of claim 19, further comprising:
   means for connecting a pair of diodes to each of the memristors to control a direction of an electrical current flowing through that memristor.

* * * * *